United States Patent

[11] 3,604,279

| [72] | Inventor | Marion H. Davis |
| | | Hagerstown, Ind. |
| [21] | Appl. No. | 854,463 |
| [22] | Filed | Sept. 2, 1969 |
| [45] | Patented | Sept. 14, 1971 |
| [73] | Assignee | Ferralog, Inc. |

[54] TWO-SPEED CENTRIFUGAL TRANSMISSION
16 Claims, 5 Drawing Figs.
[52] U.S. Cl. .................................................... 74/217 B,
74/217 S, 192/105 B
[51] Int. Cl. ..................................................... F16h 9/100,
F16d 23/10
[50] Field of Search .......................................... 74/217 B,
217 S; 192/105 B, 105 C

[56] References Cited
UNITED STATES PATENTS

| 2,488,892 | 11/1949 | Arzt .............................. | 74/217 B X |
| 2,809,535 | 10/1957 | Hein et al. .................... | 192/105 B X |
| 3,109,326 | 11/1963 | Holtan .......................... | 74/792 |

Primary Examiner—Leonard H. Gerin
Attorney—Woodard, Weikart, Emhardt & Naughton

ABSTRACT: An engine output shaft drives the input member of a clutch having a plurality of friction members normally confined around a hub by a garter spring. The clutch has two output drums, each having a sprocket thereon coupled by a chain to a sprocket on a jackshaft which is, in turn coupled through sprockets and a chain to a vehicle drive wheel. The drums have internal surfaces engageable by the friction members due to centrifugal force as the engine speed increases. The drums are of different internal diameter for sequential engagement, and the jackshaft sprockets associated therewith are also of different diameters for a low-speed drive first, and then a high-speed drive.

INVENTOR
MARION H. DAVIS
BY
Woodard, Weikart, Emhardt & Naughton
ATTORNEYS

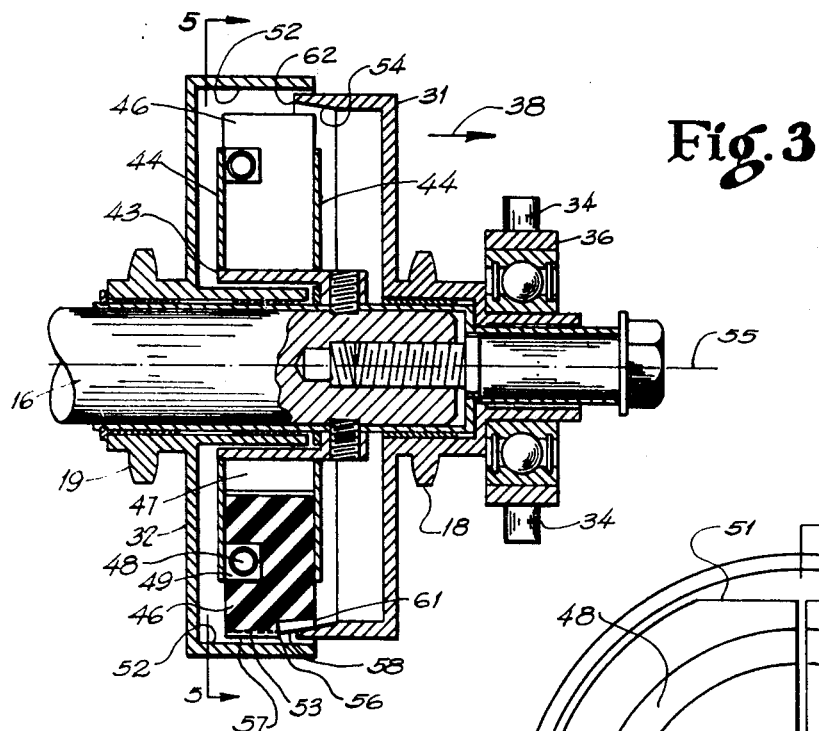
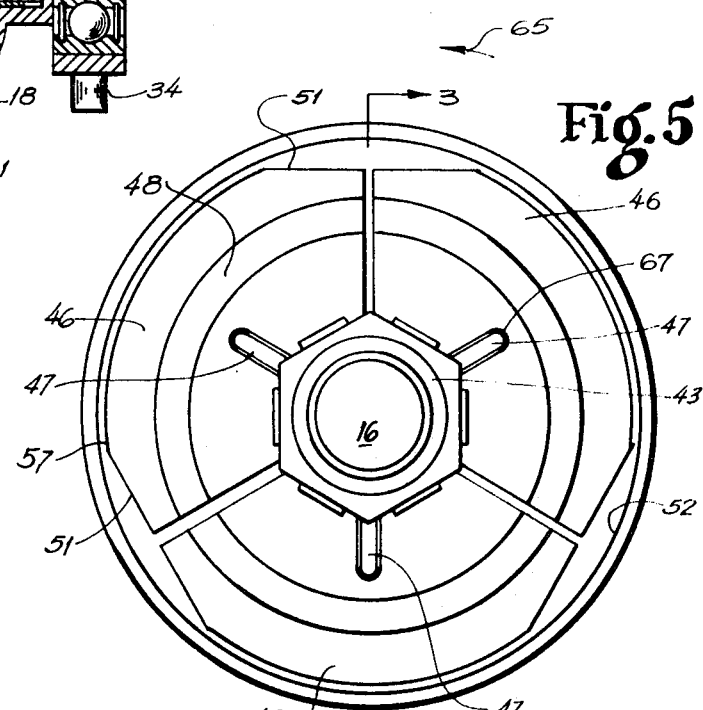
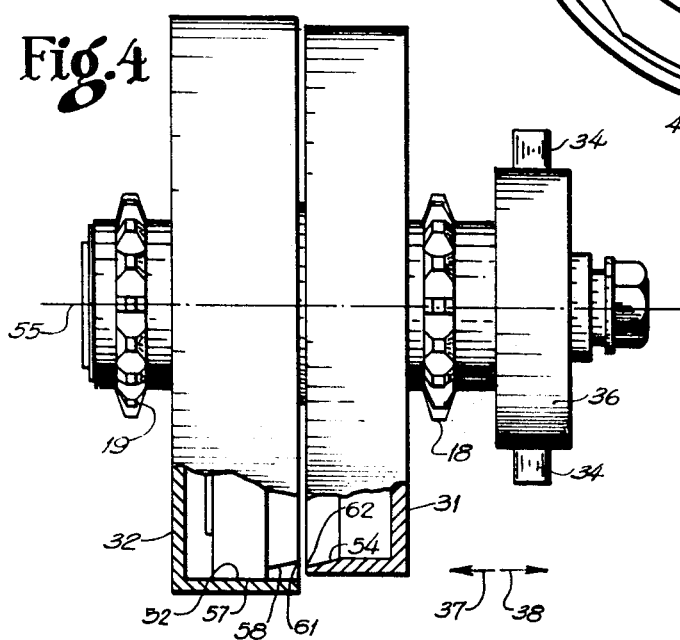

TWO-SPEED CENTRIFUGAL TRANSMISSION

BACKGROUND OF THE INVENTION

1. Field of the Invention

This invention relates generally to power transmission apparatus, and more particularly to a centrifugal clutch facilitating speed change.

2. Description of the Prior Art

Many clutches of the automatic centrifugal or spring types, are known. A typical problem with centrifugal clutches is the fact that if the spring or springs employed to keep the friction shoes retracted are strong enough to keep the shoes retracted until the engine speed is up, they are too strong to let the clutch engage strongly enough when desired. This is a particular disadvantage when a comparatively small engine is used to start a load, such as a vehicle, for example, at a single engine-to-load drive ratio. In such instances, when clutch engagement begins, the engine speed is reduced by the load and by crankshaft deceleration during the compression stroke enough to reduce the centrifugal force applying the friction elements to the point where they can no longer hold the engine torque, with resultant unloading of the engine. As the engine speeds up, especially during the explosion stroke, the clutch again attempts to engage. The normal result is a very objectionable clutch chatter, and/or vibration.

SUMMARY OF THE INVENTION

Described briefly, in a typical embodiment of the present invention, a clutch is provided with two output members, one being connected to a load for power transmission thereto at a low-speed ratio, and the other connected to the load for power transmission thereto at a high-speed ratio. A clutch input member is connected to a source of power, and he clutch output members are arranged so that one or the other of them is engageable by friction means on the input member in response to centrifugal force, with shifting means provided to determine which of the two is engaged, and thereby to determine the power transmission-speed ratio.

BRIEF DESCRIPTION OF THE DRAWING

The full nature of the invention will be understood from the accompanying drawings and the following description and claims.

FIG. 3 is an enlarged cross section through the clutch itself showing the clutch in the low-speed condition.

FIG. 4 is a section like FIG. 3 but showing the clutch in the high-speed condition.

FIG. 5 is a section taken at line 5—5 in FIG. 3 and viewed in the direction of the arrows.

DESCRIPTION OF THE PREFERRED EMBODIMENT

Figure 1:
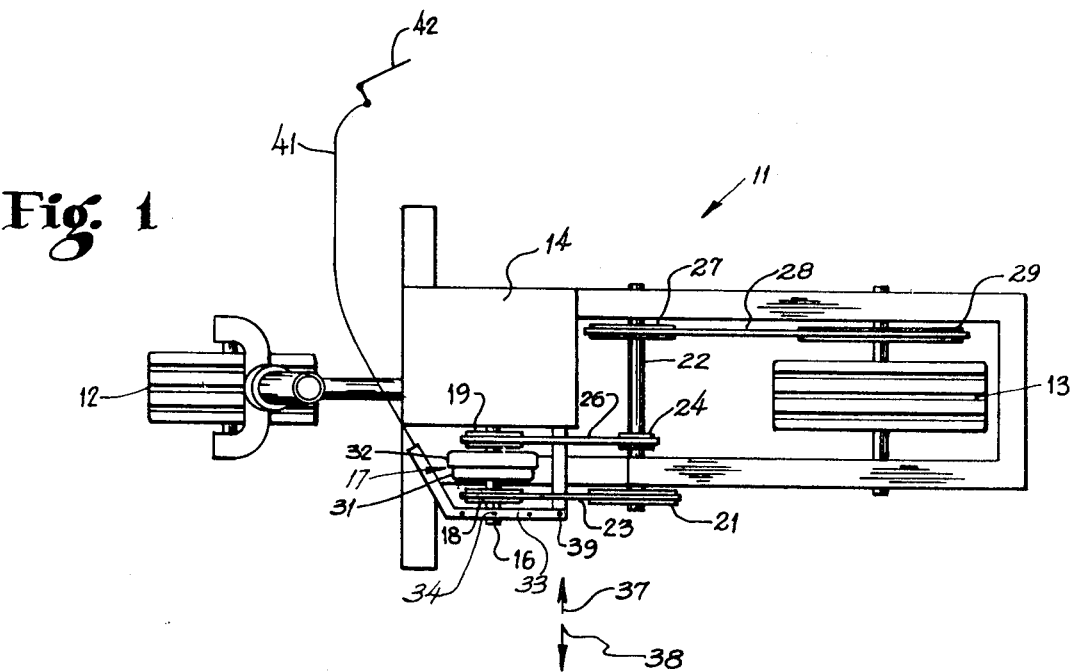
FIG. 1 is a schematic top plan view of a minibike incorporating a transmission according to a typical embodiment of the present invention.
Figure 2:
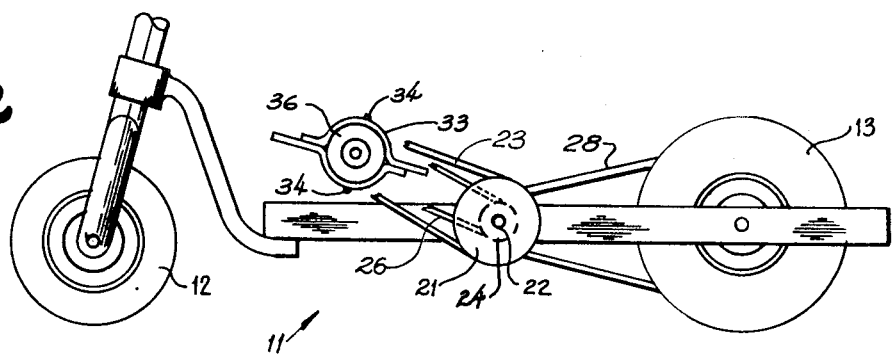
FIG. 2 is a schematic side elevational view thereof.

Referring now to the drawings in detail, the minibike 11 has a front wheel 12 which is steerable, and a rear wheel 13 which is used to drive the bike. An engine is provided at 14 and has an output shaft at 16 on which the clutch 17 of the present invention is mounted. Two identical sprockets 18 and 19 are provided on the clutch, sprocket 18 being connection to a large sprocket 21 on jackshaft 22 by means of a chain 23. The smaller sprocket 24 is secured to the jackshaft and is connected by chain 26 to the sprocket 19. A sprocket 27 on the jackshaft 22 is connected by chain 28 to the sprocket 29 connected to the drive wheel 13.

The sprocket 18 is connected to an inner clutch drum 31. Sprocket 19 is connected to an outer clutch drum 32. A shifting yoke 33 is provided to receive a pair of pins 34 mounted in the bearing cage 36 of a sealed ball bearing and pivotal to permit movement of the yoke in and out in the direction of arrows 37 and 38, respectively, parallel to the engine output shaft axis and in response to movement of the shifting fork arm about the pivot 39 by a cable 41 in response to actuation of the shift lever 42. Referring now to FIGS. 3 and 5, a clutch drive hub 43 is splined, keyed or otherwise secured to the engine crankshaft 16 to avoid relative rotation therebetween. The hub has a pair of generally circular side flanges 44 thereon with radially extendable friction members 46 disposed around the hub between the flanges 44. These friction members are slotted to normally rest on radially projecting ribs 47 secured to said hub and providing pivots 67 for the friction members. The friction members are held in this position by the garter spring 48 received in the arcuate channels 49 in the friction members. The tips of the friction members are flattened as at 51.

The clutch drive hub and friction members are disposed radially inwardly from the cylindrical inner surface 52 of the outer clutch drum 32. The outer circumferential surface of the friction members, when the clutch input shaft 16 is at rest, may be located as designated (but exaggerated for illustrative purposes) by the dotted outline 53 in FIG. 3, clearing the driven surface 52 of the clutch drum 32. The clutch drum 31 has a tapered surface 54 thereon concentric with the input shaft and clutch axis 55. In the illustrated embodiment, this a a frustoconical surface tapering toward a vertex to the right of the unit as shown in FIG. 3.

As best shown in FIGS. 3 and 4, the outer cylindrical surface of the clutch friction members is stepped. For example, a step is provided at 56 between the surface 57 and the surface 58. Surface 57 is cylindrical, and surface 58 is conical somewhat like the surface 54 of the clutch drum 31. Preferably, however, the vertex angle of the cone of the friction member is smaller than for the clutch drum surface 54. Over a period of time, however, as will become apparent, the wear on the friction members will tend to make them conform to the surfaces which they engage.

It was mentioned above, that the bearing cage 36 is shiftable axially in the direction of arrows 37 and 38. At the limit of travel in the direction of arrow 37, the clutch drum 31 is in a position such as shown in FIG. 3. At the extent of travel in the direction of arrow 38, the member 31 is in a position such as shown in FIG. 4, wherein there is no possibility of engagement between the surface 58 and surface 54 regardless of the degree of radial advance of the clutch member toward the inner surface 52 of the drum 32. In this condition, the limit of travel radially of the friction members is the cylindrical wall surface 52 of the clutch drum 32.

In operation, when the engine is operating at idling speed, the garter spring retains the friction shoes against the ribs 47 so that the cylindrical drive surfaces 57 and conical drive surfaces 58 thereof are in the position shown by the dotted outline in FIG. 3, clear of the surfaces 52 and 54, respectively, of the clutch drums 32 and 31. When engine speed is increased to a sufficient extent that centrifugal force due to rotation of the clutch hub on the shaft causes the shoes to overcome the garter spring restraint, the conical surfaces 58 near the edge 61 of the clutch shoes will engage the surface 54 of the drum 31 and drive the drum 31 in rotation. The sprocket 18 on this drum thereby drives the chain 23 and low-speed sprocket 21 on the jackshaft 22 which, in turn, drives the wheel 13.

As the vehicle accelerates, the force of engagement of the drive shoes with the drum 31 increases. However, because of the provision of the taper on the drive surface, an intentional effort applied to the drum in the direction of arrow 38 can remove the drum from engagement with the drive shoes whereupon said centrifugal force will advance them into engagement with the drive surface of drum 32. From this point in time, power transmission is from the engine through the clutch drum 32 and the sprocket 19 thereon, chain 26 and high-speed sprocket 24 to the jackshaft, and thence to the drive wheel. Therefore, with virtually no interruption of power flow, and with the engine speed maintained high enough to assure positive engagement, a shift from "low gear" to "high gear" is accomplished. The shift is made by operating the lever 42 to shift the drum 31 in direction of arrow 38 out of engagement with the friction shoes.

Note in FIG. 4, which is the high-speed condition of the clutch, the leading or entry edge 62 of the tapered surface 54 of the drum 31 is a greater radial distance from he axis 55, than is the entry edge 61 of the clutch friction member. This enables the drum 31 to be shifted intentionally in the direction of arrow 37 by operation of lever 42, to a point where the surface 54 will again engage the friction members, even while they are driving the drum 32. The purpose of this is to enable a downshift under power. Of course this shift becomes easier at lower speeds, because there is less centrifugal force on the shoes resisting their retraction by advance of the tapered surface 54 thereover in the direction of arrow 37. Because the two drums 31 and 32 are mounted to clutch hub portions by appropriate bushings, whichever of the drums is not being engaged by the clutch shoes at any time, is free to rotate at whatever speed is determined by the jackshaft sprocket to which it is connected. Because of the speed differential between the two clutch drums necessitated by the connection of both to different sized sprockets on the jackshaft, it is important that the low-speed drum 31 be disposed in the path of radial advance of the friction members to preclude their engagement with the high-speed drum during drive through the low-speed drum.

The invention claimed is:

1. A drive system comprising:
a source of power;
a load;
first transmission means connectable between said source and said load for power transmission from said source to said load at a first-speed ratio of load-speed to source-speed;
second transmission means connectable between said source and said load for power transmission from said source to said load at a second-speed ratio higher than said first ratio;
a clutch-input member connected to said source and having a centrifugally actuated first-drive member thereon;
a first-clutch-output member connected to said first transmission means;
a second-clutch-output member connected to said second transmission means;
and means for shifting said first-clutch-output member into and out of engagement and with said drive member to provide for respectively low- and high-speed ratio power transmission.

2. The drive system of claim 1 wherein:
said drive member of said clutch-input member is radially advanced by centrifugal force in response to increasing speed of said clutch-input member to engage and drive one of said output members.

3. The drive system of claim 2 wherein:
said first-clutch-output member is positionable, by said shifting means, in the pat of said centrifugal advance of said drive member toward said second-clutch-output member, whereby power transmission from said source to said load at said first-speed ratio can precede transmission at said second-speed ratio.

4. A drive system comprising:
a source of power;
a load;
first transmission means connectable between said source and said load for power-transmission from said source to said load at a first-speed ratio of load-speed to source-speed;
second transmission means connectable between said source and said load for power-transmission from said source to said load at a second-speed ratio higher than said first ratio;
a clutch-input member connected to said source and having a centrifugally actuated first-drive-member thereon;
a first-clutch-output member connected to said first transmission means;
a second-clutch-output member connected to said second-transmission means;
and means for shifting said first-clutch-output member into and out of engagement and with said drive member to provide for respectively low- and high-speed ratio power transmission;
said drive member of said clutch-input member is radially advanced by centrifugal force in response to increasing speed of said clutch-input member to engage and drive one of said output members;
said first-clutch-output member is positionable, by said shifting means, in the path of said centrifugal advance of said drive member toward said second-clutch-output member, whereby power-transmission from said source to said load at said first-speed ratio can precede transmission at said second-speed ratio;
said clutch-input and output-members have colinear axes and, said first-clutch-output member has a tapered surface thereon engageable with said drive member for driving force transmission therebetween, said taper-facilitating axial shift of said first-clutch-output member from engagement with said drive member during force transmission therebetween.

5. The drive system of claim 4 wherein:
said first-transmission means include a first sprocket on said first-clutch-output member and a second sprocket located on an output shaft and a first-chain coupling said sprockets whereby said second sprocket is driveable by said first sprocket at said first-speed ratio, and
said second-transmission means include a third sprocket on said second-clutch-output member and a forth sprocket located on said output shaft and a second-chain coupling said third and fourth sprockets, the sizes of said third and fourth sprockets being such that said fourth sprocket is driveable by said third sprocket at said second-speed ratio.

6. The drive system of claim 4 wherein:
said drive member has a first-circular-drive surface portion engageable with said second-clutch-output member, and a second-circular-drive surface portion at lesser radial distance from said axes than said first portion and engageable with said tapered surface of said first-clutch-output member, said tapered surface having an entry edge at greater radial distance from said axes than said second-circular-drive surface portion when said drive member has been radially advanced to engage said second-clutch-output member to enable the tapered surface of said first-clutch-output member to cam said friction member inwardly away from said second-output member upon axial shifting of said first member for low-speed ratio operation.

7. The drive system of claim 6 and further comprising:
at least one additional drive member located on said clutch-input member and centrifugally advanceable like said first drive member, said drive members each having a pivot point on said input member, the first-circular-drive surfaces of said drive members being terminated between the ends thereof.

8. A selectable output-clutch comprising:
a drive member having at least one friction member thereon;
a first driven member having a drive surface engageable by said friction member to enable said friction member to drive said first driven member;
a second driven member having a drive surface engageable by said friction member to enable said friction member to drive said second driven member;
said first driven member being axially movable relative to said second driven member into position precluding engagement of said drive surface of said second member by said friction member during engagement of said drive surface of said first member by said friction member.

9. A selectable output-clutch comprising:

a drive member having at least one friction member thereon;

a first driven member having a drive surface engageable by said friction member to enable said friction member to drive said first driven member;

a second driven member having a drive surface engageable by said friction member to enable said friction member to drive said second driven member;

said first driven member being positionable relative to said second driven member to preclude engagement of said drive surface of said second member by said friction member during engagement of said driven surface of said first member by said friction member;

said first driven member being shaped to permit intentional engagement of said dive surface thereof with said friction member while said friction member is in engagement with said drive surface of said second member.

10. A selectable output-clutch comprising:

a drive member having at least one friction member thereon;

a first driven member having a drive surface engageable by said friction member to enable said friction member to drive said first driven member;

a second driven member having a drive surface engageable by said friction member to enable said friction member to drive said second driven member;

said first drive member being positionable relative to said second drive member to preclude engagement of said drive surface of said second member by said friction member during engagement of said drive surface of said first member by said friction member;

said drive surface of said first driven member being an inner tapered surface of revolution about a central axis of said fist driven member, said drive surface of said second driven member being an inner cylindrical surface, said drive member and said first and second driven members having colinear axes.

11. The combination of claim 10 and further comprising:

shifting means coupled to said first driven member to shift it axially into and out of position for engagement of said drive surface thereof by said friction member.

12. The combination of claim 11 wherein:

said friction member has a drive surface which is an outer tapered surface of revolution about a central axis colinear with the central axis of said first driven member, the tapered drive surface of said first driven member having an entry edge radially outward of an entry edge of said tapered surfaces of said friction member during engagement of the drive surface of said second member by said friction member, to enable reception of said drive surface of said first driven member on said tapered surface of said friction member upon axial shift of said first driven member.

13. The combination of claim 8 and further comprising:

additional friction members, said drive member having a hub, and said friction members being mounted on said hub and radially restrained, said friction members being radially extendible by centrifugal force upon increasing rotational speed of said hub for engagement of said friction members with said driven members.

14. The combination of claim 13 wherein:

said first and second driven members are drums, with said first driven member having a shifting ring rotatably mounted thereto but axially fixed thereto facilitating axial movement of said first member with respect to said second member.

15. The combination of claim 13 wherein:

said drive surfaces are circular and said friction members have circular surfaces engageable therewith, said friction members having pivot points on said hub, said pivot points being provided by axially extending ribs on said hub, said ribs being radially spaced from the axis of the hub and circularly spaced from each other and disposed in grooves in said friction members, said friction members being radially resiliently restrained by a garter spring thereon.

16. The combination of claim 15 and further comprising:

a first output sprocket on said first driven member; and a second output sprocket on said second driven member.

UNITED STATES PATENT OFFICE
CERTIFICATE OF CORRECTION

Patent No. 3,604,279      Dated September 14, 1971

Inventor(s) Marion H. Davis

It is certified that error appears in the above-identified patent and that said Letters Patent are hereby corrected as shown below:

Page 1, the Assignee should be --Ferraloy-- instead of "Ferralog"

Column 1, line 66, "connection" should be --connected--

Column 2, line 46, "member" should be --members--

Column 3, line 7 "from he" should be --from the--

Column 3, line 58 "pat" should be --path--

Column 5, line 15 "dive" should be --drive--

Column 5, line 34 "fist" should be --first--

Signed and sealed this 28th day of March 1972.

(SEAL)
Attest:

EDWARD M. FLETCHER, JR.
Attesting Officer

ROBERT GOTTSCHALK
Commissioner of Patents